United States Patent [19]
Liu et al.

[11] Patent Number: 5,777,310
[45] Date of Patent: Jul. 7, 1998

[54] PROBLEM REDUCTION WITH LOW LEVEL INFORMATION INTEGRATION IN BAR CODE DECODING

[75] Inventors: Lingnan Liu, Mill Creek; Mark Yukio Shimizu, Seattle, both of Wash.

[73] Assignee: Intermec Corporation, Everett, Wash.

[21] Appl. No.: 554,184

[22] Filed: Nov. 6, 1995

[51] Int. Cl.$^6$ .................................................. G06K 07/10
[52] U.S. Cl. .................................................. 235/462; 235/437
[58] Field of Search .................................. 235/462, 463, 235/437

[56] References Cited

U.S. PATENT DOCUMENTS

| | | | |
|---|---|---|---|
| 4,728,784 | 3/1988 | Stewart | 235/462 |
| 4,916,297 | 4/1990 | Tukada et al. | 235/462 |
| 4,973,829 | 11/1990 | Ishida et al. | 235/462 |
| 5,262,626 | 11/1993 | Goren et al. | 235/462 |
| 5,276,316 | 1/1994 | Blanford | 235/462 |
| 5,278,398 | 1/1994 | Pavlidis et al. | 235/462 |
| 5,296,691 | 3/1994 | Waldron et al. | 235/462 |
| 5,387,787 | 2/1995 | Waldron et al. | 235/462 |
| 5,438,188 | 8/1995 | Surka | 235/462 |
| 5,444,231 | 8/1995 | Shellhammer et al. | 235/462 |
| 5,457,308 | 10/1995 | Spitz et al. | 235/462 |
| 5,478,999 | 12/1995 | Figarella et al. | 235/462 |
| 5,495,097 | 2/1996 | Katz et al. | 235/462 |
| 5,550,365 | 8/1996 | Klancnik et al. | 235/462 |

*Primary Examiner*—Donald T. Hajec
*Assistant Examiner*—Douglas X. Rodriguez
*Attorney, Agent, or Firm*—Graham & James LLP

[57] ABSTRACT

A bar code imaging system capable of accurately and efficiently reading a printed bar code that is partially damaged, distorted, or erased. The bar code imaging system comprises an imaging element adapted to receive light reflected from a bar code symbol and provide a two-dimensional image of the bar code symbol. The two-dimensional image is decoded into data representative of the bar code symbol. More particularly, code words in the bar code pattern are decoded along a path beginning at the start of the bar code and moving toward the end of the bar code. As each code word is decoded, the decoded data is stored in a memory. When an invalid code word is encountered, decoding continues along a path beginning at the end of the bar code and moving toward the beginning of the bar code, and the decoded data is stored in the memory with the previously decoded data. When an invalid code word is encountered, the scan path is moved, and decoding continues along the new scan path beginning at the last valid code word decoded while moving toward the end of the bar code.

26 Claims, 3 Drawing Sheets

PROBLEM REDUCTION WITH LOW LEVEL INFORMATION INTEGRATION IN BAR CODE DECODING

BACKGROUND OF THE INVENTION

1. Field of the Invention

The present invention relates to electro-optical imaging systems for reading bar code symbols, and more particularly, to a method, product, and apparatus for efficiently reading a corrupted bar code.

2. Description of Related Art

It is increasingly commonplace within industry to utilize bar code symbols printed on objects in order to identify the objects and convey information regarding the objects. A conventional bar code symbol comprises a pattern of vertical bar elements of various widths separated by space elements of various widths. The modulated widths of the bar and space elements can be interpreted by an electro-optical imaging system that converts the symbols into an electrical signal, which is then decoded to provide a decoded representation of the bar code symbol. Bar code symbologies of this nature are commonly used in various applications, such as inventory control, point of sale identification, or logistical tracking systems.

Electro-optical imaging systems read the bar code patterns by directing light onto the printed bar code pattern and detecting light that reflects off of the pattern. Because the bar elements in the pattern have different reflectivity characteristics than the space elements, the reflected light can be converted into electrical signals that represent the pattern. Traditionally, two types of electro-optical imaging systems have been used to read a printed bar code pattern: active systems and passive systems.

An active system reads a bar code pattern by reflecting a beam of light off of a "spot" on the bar code and detecting the reflected light. The light is typically generated using a laser source or a light emitting diode (LED). In order to read the entire bar code, the beam must be moved across the bar code pattern along a line that is substantially perpendicular to the bar and space elements of the pattern. The operator can physically move the light across the bar code field, such as by use of a light pen. Alternatively, a bar code reader may include movable mirrors that automatically direct the light back and forth at a high rate to scan across the bar code field. The operator would normally be provided with a feedback signal, such as an audible tone, that alerts the operator as to the successful completion of a bar code reading operation.

A passive system converts an area extending across the entire bar code symbol into pixel information. The bar code is illuminated, and light reflects off of the bar code onto a charge-coupled device (CCD), which converts the reflected light into pixel data representing the bar code. An image of the bar code is then optically transferred to a linear or multi-dimensional array of adjacent photo diodes that comprise the CCD device. Each of the photo diodes defines a distinct picture element (or pixel) of the array. The CCD array is then scanned electronically by activating the individual photo diodes in a sequential manner.

Typically, both types of electro-optical readers sample the bar code along a one dimensional scan line that passes through the bar code pattern. If the bar code pattern contains a damaged, distorted, or erased portion somewhere along the scan line, the sample must be rejected as invalid. Conventionally, electro-optical readers overcome this problem by repeatedly re-scanning the bar code along new scan lines until a line is found that does not pass through the damaged, distorted, or erased portion of the bar code.

A drawback to repeatedly re-scanning the bar code along new scan lines is that it may be time consuming because numerous attempts may be required for particularly poor bar codes. Another drawback to repeatedly re-scanning along new scan lines is that such an approach may fail because there may be no single line along which there are no distorted, damaged, or erased portions of the bar code.

Some conventional electro-optical imaging systems have attempted to overcome the problems associated with reading a partially distorted, damaged, or erased bar code by storing partial data from multiple failed attempts at reading the bar code and then using statistical techniques to reconstruct the entire bar code. A drawback to such statistical approaches, however, is that they require a substantial computational effort and do not always yield accurate results.

Accordingly, a critical need exists for an electro-optical imaging system that is capable of accurately and efficiently reading a bar code that is partially distorted, damaged, or erased. Such a system should be able to decode a bar code even if there is not a continuous scan path across the bar code through which there are no damaged, distorted, or erased areas. Furthermore, as the system decodes a bar code, it should not decode elements of the bar code that have already been decoded, and the decoding should result in complete information about the bar code.

SUMMARY OF THE INVENTION

In accordance with the teachings of the present application, a bar code imaging system is capable of accurately and efficiently reading a bar code that is partially distorted, damaged, or erased.

The bar code imaging system comprises an imaging element adapted to receive light reflected from a bar code symbol and provide a two-dimensional image of the bar code symbol. The two-dimensional image is decoded into data representative of the bar code symbol. More particularly, code words in the bar code pattern are decoded along a path beginning at the start of the bar code. When an invalid code word is encountered, decoding continues along a new path beginning at the end of the last valid code word.

A more complete understanding of the method and apparatus for accurately and efficiently decoding a corrupted bar code will be afforded to those skilled in the art, as well as a realization of additional advantages and objects thereof, by a consideration of the following detailed description of the preferred embodiment.

Reference will be made to the appended sheets of drawings which will first be described briefly.

DETAILED DESCRIPTION OF THE PREFERRED EMBODIMENT

The invention of the present application meets the critical need for an electro-optical imaging system that accurately and efficiently reads a bar code that is partially distorted, damaged, or erased. Moreover, the system is able to read such a bar code even if there is not a continuous scan line across the bar code through which there are no damaged, distorted, or erased areas.

All that the system requires is that there be continuous scan lines across each code word in the bar code. Furthermore, as the system decodes the bar code, it stores decoded code words so that it need not decode any of the code words more than once, and if decoding is successful, the decoded data represents complete information about the bar code. In the detailed description that follows, like element numerals are used to describe like elements in one or more of the figures.

Figure 1:
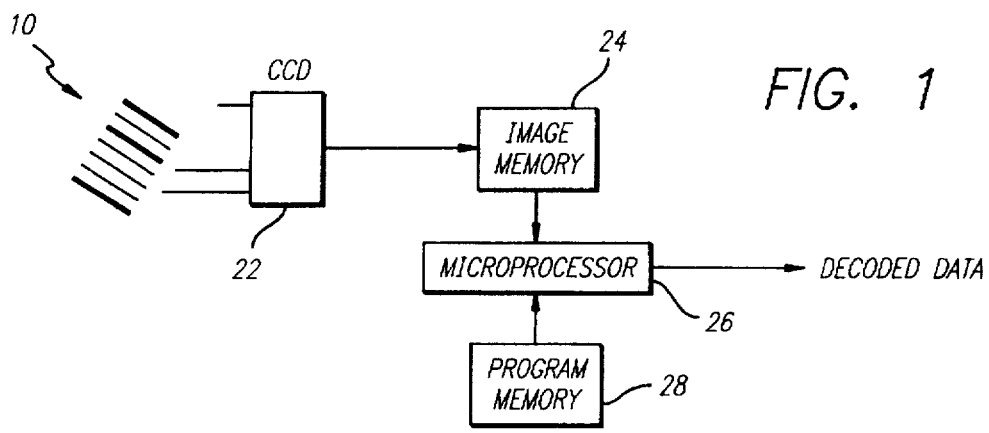
FIG. 1 is a block diagram of an electro-optical bar code imaging system of the present invention.

Referring first to FIG. 1, a block diagram of an electro-optical bar code imaging system is illustrated that includes the teachings of the present invention. The bar code imaging system permits a user to scan or read the information contained in a bar code symbol, such as the exemplary bar code symbol 10. Bar code symbol 10 comprises a pattern of parallel bar and space elements of varying widths. As known in the art, the individual bar and space elements form patterns known as code words each of which represents data. Typically, the code words represent alphanumeric symbols. The code words in a particular bar code pattern can be decoded by use of the present bar code imaging system, even if one or more code words are partially distorted, damaged, or erased.

The bar code imaging system comprises an imaging element 22 that is brought into proximity with the bar code symbol 10 to produce a two-dimensional image of the bar code symbol. A light source (not shown) illuminates the bar code symbol 10. Light reflects off the bar code symbol 10 onto the surface of a charge coupled device (CCD) used to generate the two-dimensional image of the bar code symbol. The CCD imaging element 22 converts the reflected light into an electrical signal. The CCD imaging element 22 comprises a two-dimensional array of adjacent photo diodes, with each one of the photo diodes defining a distinct picture element (or pixel) of the array.

It should be noted that the array of the CCD imaging element is not limited to any particular pattern. For example, the array can be arranged in the usual order of linear rows and columns; the array can be arranged in a diamond pattern in which the rows are linear and the columns are offset in a regular fashion; or the array can be arranged in any other pattern in which the pixels are ordered relative to each other.

Each pixel of the CCD array generates a voltage that represents the gray scale contrast of the two-dimensional image at that particular location. The CCD array is scanned electronically by activating the individual photo diodes in a sequential manner in order to produce an output signal containing the voltage levels from each photo diode. The detected voltage levels can then be converted to binary data values that correspond to the gray scale contrast associated with each pixel.

The imaging element 22 transmits the binary data of the CCD array to an image memory 24 that temporarily stores the data. The image memory 24 typically comprises a semiconductor-based random access memory (RAM), and can be provided by conventional dynamic RAM (DRAM) devices. The image memory 24 permits an image from the imaging element 22 to be captured. Specifically, the binary data values produced by the CCD array are transferred into the image memory 24, and each particular data value is stored in a corresponding memory cell of the image memory.

Since the image memory 24 is volatile, it will hold the data from the imaging element 22 only as long as electrical power is applied to the image memory.

The present bar code imaging system further comprises a microprocessor 26 that controls the operation of the imaging system. A program memory 28 coupled to the microprocessor 26 contains an instruction set, i.e., software, that is executed in a sequential manner by the microprocessor. The software defines the operation of the imaging system, and in particular, defines the steps required to decode the data stored in the image memory 24 into usable data representative of the information contained within the bar code symbol 10. This software may also perform other related functions, such as transmitting and displaying the coded data.

As known in the art, the program memory 28 is provided by conventional semiconductor based read-only memory (ROM) devices. Such ROM devices are non-volatile, and permit the stored instructions to remain in storage within the devices even after electrical power is removed. It should be apparent that the functions performed by the stored program may also be accomplished by traditional hard-wired logic circuits, but software systems are preferred due to their relative simplicity, adaptability to change, and low cost. It should also be apparent that the ROM devices may further be erasable or programmable, so that modifications or revisions to the software can be implemented as desired. Moreover, other permanent storage media can be utilized as program memory 28, such as magnetic disks.

The entire imaging system, including the imaging element 22, the imaging memory 24, the microprocessor 26, and the program memory 28 may be contained within a single unit. Alternatively, the elements may be distributed, such as with the imaging element 22 disposed in a remote device and the other elements disposed in a central unit. This way, the operator can utilize a simple, lightweight unit, such as a hand-held device, that transmits image data to the central unit for decoding. The decoded data may then be transmitted to an attached computer, stored locally for later transfer, or forwarded to an application program resident within the imaging system itself.

Figure 2:
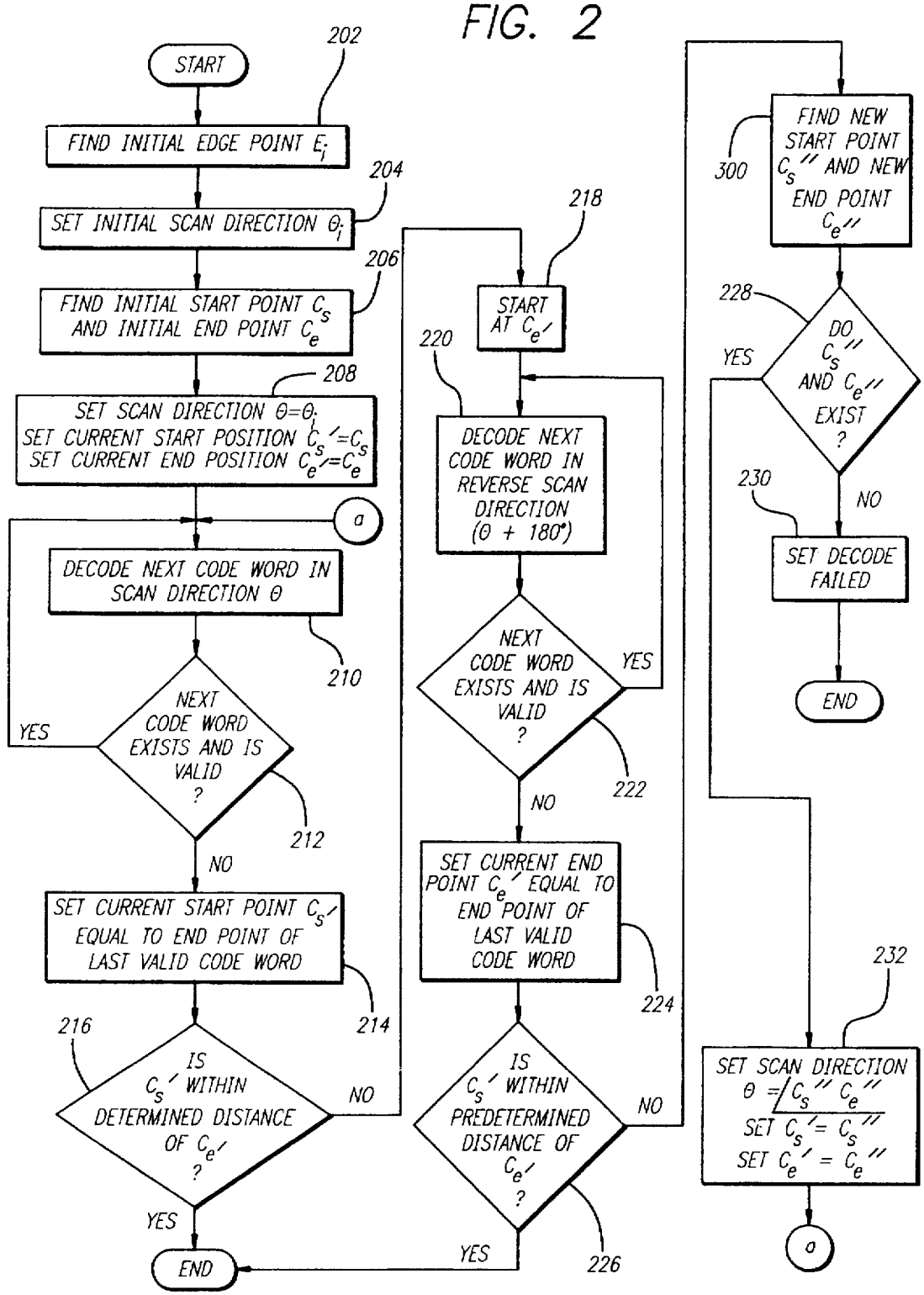
FIG. 2 illustrates the operation of the decoding process of the present invention.
Figure 3:
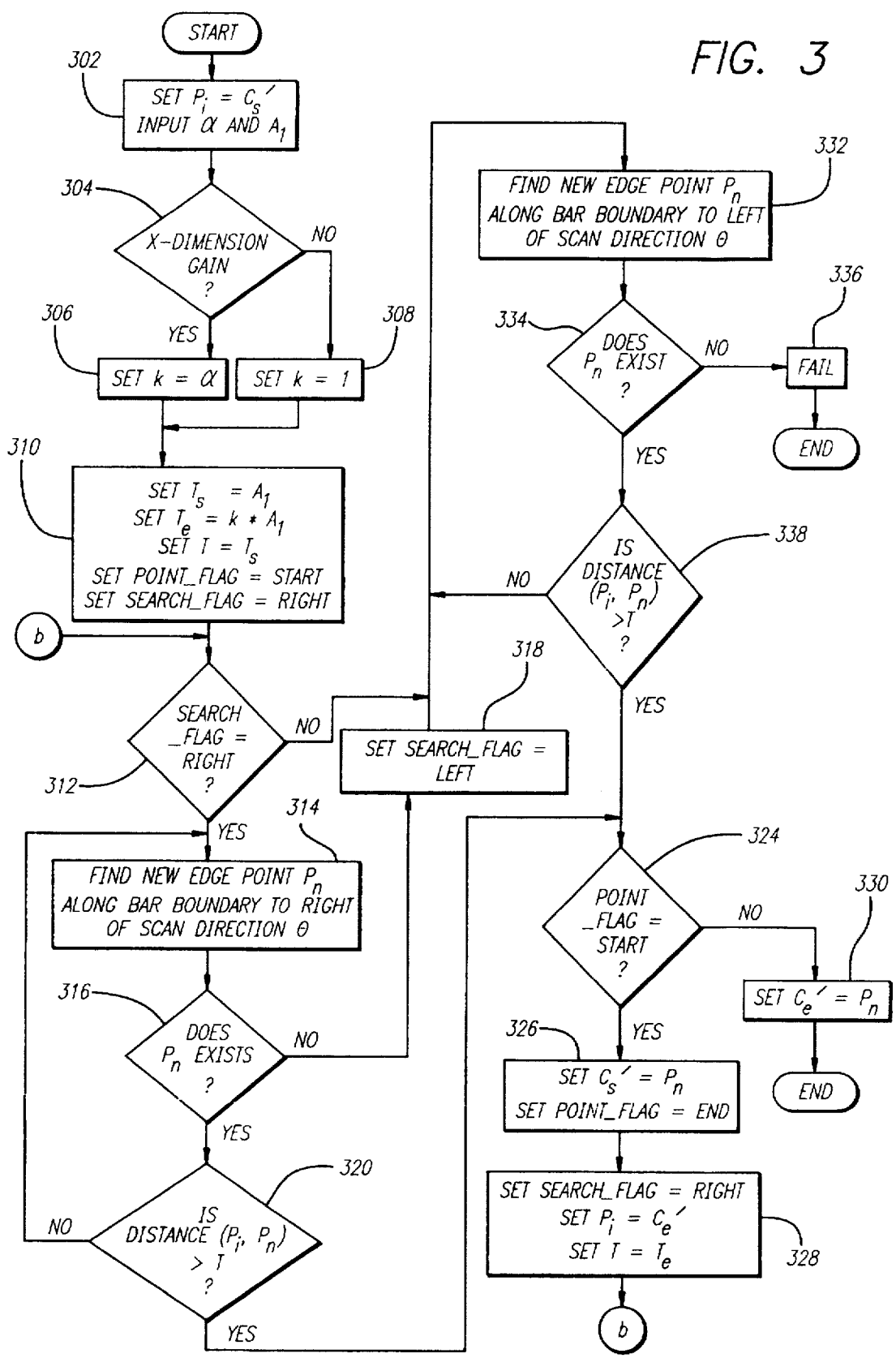
FIG. 3 illustrates the operation of the process of finding new start and end points.

The process of decoding binary data from the CCD array that represents a bar code pattern and is stored in the image memory 24 will now be described with references to FIGS. 2 and 3. Referring first to FIG. 2, the process first performs various initialization steps. More particularly, the process finds an initial edge point $E_i$ on the bar code at step 202. The initial edge point $E_i$ may be any point on the bar code, and data defining the initial edge point $E_i$ may be received from a source outside the system of the present invention, such as another system, or may be data that was previously stored within the system of the present invention.

The process then sets an initial scan direction $\theta_i$ at step 204, which may be any direction that would cause a line passing through the initial edge point $E_i$ in the initial scan direction $\theta_i$ to pass through all of the bar and space elements of the bar code. Typically, the scan direction $\theta$ is defined in terms of an angle with 0° defining a direction moving left to right through the bar code pattern along a line perpendicular to the bar and space elements of the pattern. Data defining the initial scan direction $\theta_i$ may be received from a source outside the system of the present invention, such as another system, or may be data that was previously stored within the system of the present invention.

The process then finds an initial end point $C_e$ and an initial start point $C_s$ on the bar code pattern at step 206. The process finds the initial end point $C_e$ by moving from the initial edge point $E_i$ in the initial scan direction $\theta_i$ until reaching the end of the bar code pattern, which is typically defined to be an outer edge of the last bar or space element of the last code word in the bar code pattern. The process finds the initial start point $C_s$ by moving from the initial edge point $E_i$ in the reverse initial scan direction ($\theta_i+180°$) until reaching the beginning of the bar code pattern, which is typically defined to be an outer edge of the first bar or space element of the first code word in the bar code.

The process then sets a scan direction variable $\theta$ equal to the initial scan direction $\theta_i$ and also sets a current start point variable $C_s'$ and a current end point variable $C_e'$ equal to the initial start point $C_s$ and the initial end point $C_e$ respectively at step 208.

After completing the above described initialization steps, the process begins decoding the bar code. Beginning at the current start point $C_s'$ and moving along a scan line defined by the scan direction $\theta$, the process decodes the bar code one code word at a time until encountering an invalid code word or determining that no more code words exist at steps 210, 212. More particularly, the process reads the code word located at the current start point $C_s'$ and compares the code word to a list of known code words. If the read code word matches one of the known code words, the data that the code word represents is stored in a memory. The process than reads the next code word along the scan line and compares it to the list of known code words. Again, if a match is found, the data that the read code word represents is stored in the memory. This process is repeated along the scan line until no more code words remain or until the read code word does not match a known code word, which means that the read code word is invalid. Typically, a code word is invalid because a portion of the printed bar code pattern corresponding to the code word is damaged, distorted, or erased.

If the process encounters an invalid code word or determines that no more code words exist along the scan line at step 212, the process sets the current start point $C_s'$ equal to the intersection of the scan path and a boundary of one of the bar or space elements of the last valid code word at step 214, which is typically an outermost boundary of the last valid code word. The process then determines whether the current start point $C_s'$ and the current end point $C_e'$ are within a predetermined distance at step 216. If so, the bar code has been completely decoded, and the process ends.

If the current start point $C_s'$ and the current end point $C_e'$ are not within a predetermined distance at step 216, the process begins at the current end point $C_e'$ and, moving along a scan line defined by the reverse scan direction ($\theta+180°$), decodes the bar code one code word at a time until encountering an invalid code word or determining that no more code words exist at steps 218, 220, 222. As the process decodes each code word, it stores the decoded data in the memory with previously decoded code words. If the process encounters an invalid code word or determines that no more code words exist at step 222, the process sets the current end point $C_e'$ equal to the intersection of the scan path and a boundary of one of the bar or space elements of the last valid code word at step 224, which is typically an outermost boundary of the code word.

The process then determines whether the current start point $C_s'$ and the current end point $C_e'$ are within a predetermined distance at step 226. If so, the bar code has been completely decoded, and the process ends. Otherwise, the process follows the bar element boundary on which the current start point $C_s'$ is located and finds a new start point $C_s''$ at step 300. Likewise, the process follows the bar element boundary on which the current end point $C_e'$ is located and finds a new end point $C_e''$ at step 300. The process of finding new start and end points will be described in detail below.

If the process is unable to find a new start point $C_s''$ or a new end point $C_e''$, the process sets an indicator indicating that decode of the bar code failed at step 230, and decoding ends.

Otherwise, the process sets the current start point variable $C_s'$ and the current end point variable $C_e'$ equal to the new start point $C_s''$ and the new end point $C_e''$ respectively at step 232. The process also sets the scan direction variable $\theta$ in accordance with the new start point $C_s''$ and the new end point $C_e''$ at step 232.

Typically, the scan direction $\theta$ variable would be set equal to an angle formed by a line perpendicular to the bar and space elements of the bar code and a line defined by the new start point $C_s''$ and the new end point $C_e''$. Then, using the new start point $C_s''$, the new end point $C_e''$, and the new scan direction $\theta$, the process repeats the decoding process as described above beginning with step 210.

The process of finding new start and end points 300 will now be described with reference to FIG. 3. The process begins with initialization steps. More particularly, the process determines whether there is to be an x-dimension gain at step 304. That determination may be based on data received from outside the system of the present invention, such as another system, or data previously stored in the system of the present invention. An x-dimension gain means that the minimum acceptable distance between the current end point $C_e'$ and the new end point $C_e''$ is greater than the minimum acceptable distance between the current start point $C_s'$, and the new start point $C_s''$.

The process then sets a new start point distance threshold variable $T_s$ equal to the minimum acceptable distance between the current start point $C_s'$ and the new start point $C_s''$ at step 310.

The process also sets a new end point distance threshold variable $T_e$ equal to the minimum acceptable distance between the current end point $C_e'$ and the new end point $C_e''$ at step 310. If there is to be an x-dimension gain, $T_e$ is set with a greater value than $T_s$ at steps 306, 310. If, on the other hand, there is not to be an x-dimension gain, $T_e$ is set with a value equal to $T_s$ at steps 308, 310. The values of $T_e$ and $T_s$ may depend on data received from outside the system of the present invention, such as another system, and/or may depend on data previously stored within the system of the present invention.

After completing the initialization steps, the process searches for a new start point $C_s''$ on the bar or space element boundary along which the current start point $C_s'$ is located. The search begins at the current start point $C_s'$ and moves along the bar element boundary to the right of the scan direction $\theta$ at step 314. The search looks for the next pixel following the current start point $C_s'$ having a grey scale value sufficiently dark to be considered part of a bar element. Once such a point is found, the process determines whether the distance between the point and the current start point $C_s'$ is greater than the new start point distance threshold variable $T_s'$ at step 320. If not, the system continues searching for a new point at step 314.

If no new point is found to the right of the scan line $\theta$ that is farther from the current start point $C_s'$ than a distance equal to the new start point distance threshold value $T_s'$ the process searches for a new start point $C_s''$ to the left of the scan direction θ at steps 318, 332, 334, 338. If the process does not find a new start point $C_s"$ at step 334, the decoding process fails at step 336, and processing ends. If the process finds a new start point $C_s"$, it sets the current start point $C_s'$ equal to the new start point $_s"$ at step 326, and searches for a new end code point $C_s"$.

The process searches for a new end point $C_e"$ in much the same way that it searches for a new start point $C_s"$. More particularly, the process searches along the bar or space element boundary on which the current end point $C_e'$ is located. The process first searches to the right of the scan direction θ at steps 314, 316, 320. If the process does not find a new point to the right, the process searches to the left of the scan direction θ at steps 332, 334, 338. If no new point is found, the decoding process fails and processing ends at step 336. Otherwise, the process sets the current end code point $C_e'$ equal to the new end point $C_e"$ at step 330.

Rather than always searching for the new start point $C_s"$ prior to searching for the new end point $C_e"$, the system may alternatively first determine which bar element is thicker—the bar element on which the current start point $C_s'$ is located or the bar element on which the current end point $C_e'$ is located—and then search along the thicker bar element before searching along the thinner bar element. For example, if the bar element along which the current end point $C_e'$ is located is thicker than the bar element along which the current start point $C_s'$ is located, the system would search for a new end point $C_e"$ before searching for a new start point $C_s"$. This may be advantageous when one of the bar elements is particularly thin because it may be difficult to find a new point along a particularly thin bar element. By searching along the thicker bar element first, information about the new point found along the thicker bar element can be used to set a new point along the thinner bar element if the search along the thinner bar element fails.

FIGS. 4a–4e illustrate the operation of the decoding process of the present invention on an exemplary bar code. Shown in FIGS. 4a–4e is a bar code encoded using the well known Code 39 symbology. The bar code contains six code words 401–406. The first code word 401 encodes the "start" indicator, indicating the beginning of the bar code. The second, third, fourth, and fifth code words 402–405 encode the letters "C", "0", "D", and "E" respectively. The sixth code word 406 encodes the "stop" indicator, indicating the end of the bar code. As can be seen, the third and fifth code words are partially damaged 410, 412.

Prior to the decoding process, the printed bar code is converted into a pixel data representation by a electro-optical imaging system and the pixel data is stored in the image memory 24 as described above. The decoding process of the present invention then decodes the bar code as follows.

Figure 4A:
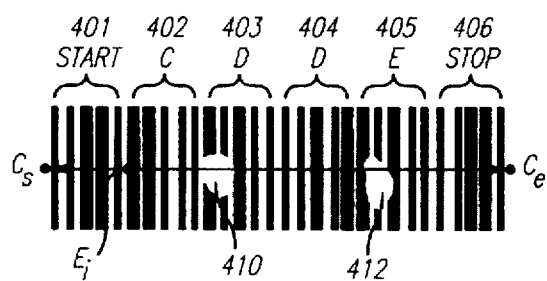
FIGS. 4a–4e illustrate an example of the operation of the decoding process of the present invention on a partially damaged bar code.

The decoding process first finds an initial start point $C_s$ and an initial end point $C_e$ within the pixel representation of the bar code. Assuming that the process receives as inputs an initial edge point $E_1$ as shown in FIG. 4a and an initial scan direction $θ_i$ (not shown) of 0° (i.e., left to right along a line perpendicular to the bar and space elements of the bar code), the system finds the initial end point $C_e$ by moving in the initial scan direction $θ_i$ from $E_i$ until reaching an outer edge of the bar code as shown in FIG. 4a. Also as shown in FIG. 4a, the system finds the initial start point $C_s$ by moving in a direction opposite to the initial scan direction ($θ_i$+180°) from $E_i$ until reaching an outer edge of the bar code. The system than sets the current start point variable $C_s'$ equal to the initial start point $C_s$, the current end point variable $C_e'$ equal to the initial end point $C_e$, and the scan direction variable θ equal to the initial scan direction $θ_i$.

Figure 4B:
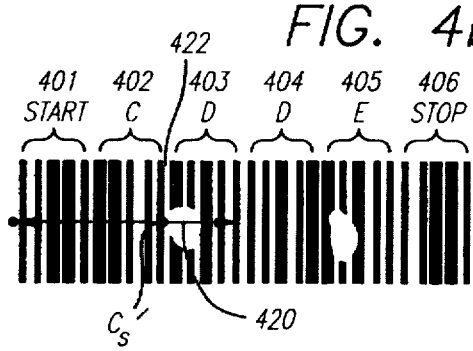

The process then begins to decode the bar code. It starts at the current start point $C_s'$ and decodes along a scan line 420 defined by the current start position $C_s'$ and the scan direction θ. As shown in FIG. 4b, the process decodes and validates the first and second code words 401, 402. As each code word is decoded and validated, decoded data is stored in a memory. Because some of the bar elements in the third code word 403 are damaged, the third code word does not validate. After determining that the third code word 403 is invalid, the process sets the current start point variable $C_s'$ equal to the intersection of the scan line 420 and the boundary of the outermost bar element 422 in the last valid code word, i.e., the second code word 402, as shown in FIG. 4b.

Figure 4C:
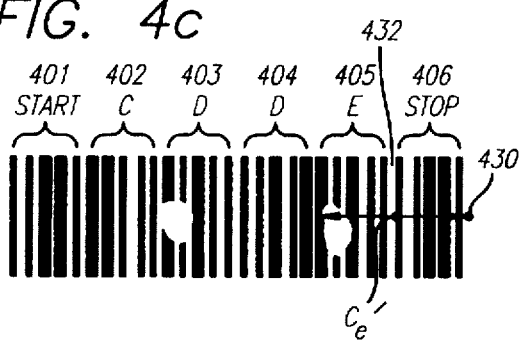

The process then continues to decode the bar code starting at the current end point $C_e'$ and decoding along a scan line 430 in a direction opposite to the scan direction θ (θ+180°). As shown in FIG. 4c, the process decodes and validates the sixth code word 406. The decoded data is stored in memory with the decoded data for already decoded code words one and two 401, 402. Because some of the bar elements in the fifth code word 405 are damaged, the fifth code word does not validate. After determining that the fifth code word 405 is invalid, the process sets the current end point variable $C_e'$ equal to the intersection of the scan line 430 and the boundary of the outermost bar element 432 of the last valid code word, i.e., the sixth code word 406, as shown in FIG. 4c.

Figure 4D:
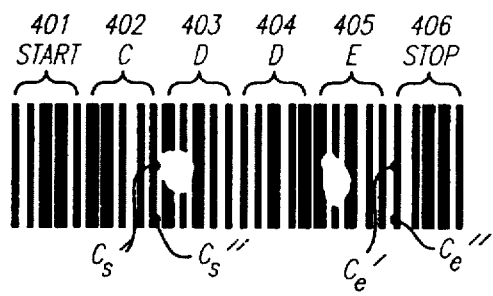

At this point in time, the process has successfully decoded the first, second, and sixth code words (401, 402, 406) in the bar code and decoded data from each of those code words have been stored in a memory. In order to decode the remaining code words, the process finds a new start point $C_s"$ and a new end point $C_e"$. As shown in FIG. 4d, the process finds the new start and end points by moving along the outer boundaries of the last code words to be decoded successfully. More particularly, the process finds the new start point $C_s"$ by moving along an outermost boundary of the second code word 422 as show in FIG. 4d. similarly, the process finds the new end point $C_e"$ by moving along an outermost boundary of the sixth code word 432 also as show in FIG. 4d.

Figure 4E:
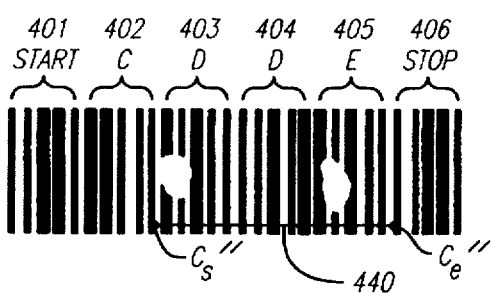

After finding the new start and end points, the process sets the current start point variable $C_s'$ equal to the new start point $C_s"$ and the current end point variable $C_e'$ equal to the new end point $C_e"$. The process then decodes code words three, four, and five (403–405) by repeating the above described decoding steps along a new scan line 440 defined by the new start and end points as shown in FIG. 4e. Finally, the process stores the decoded data for code words three, four, and five (403–405) in the memory with data for the already decoded code words one, two, and six (401, 402, 406).

Having thus described a pref erred embodiment of the method and apparatus for accurately and efficiently decoding a corrupted bar code, it should be apparent to those skilled in the art that certain advantages of the system within have been achieved. It should also be appreciated that various modifications, adaptations, and alternative embodiments thereof may be made within the scope and spirit of the present invention. For example, although in the above described embodiments the initial, current, and new start and end points are located along bar element boundaries, those points could alternatively be located along space element boundaries.

In addition, in the above described embodiment, decoding is carried out along a first scan line in both a forward direction (i.e., beginning at the initial start point and moving toward the initial end point) and a backward direction (i.e., beginning at the initial end point and moving toward the initial start point) before decoding is continued along a second scan line created by moving the first scan line. Alternatively, decoding could be carried out along the first scan line in only one direction before continuing to decode along a second scan line.

For example, decoding could be carried out along a first scan line moving in a forward direction (i.e., beginning at the initial start point and moving in the direction of the initial end point). After encountering an invalid code word along the first scan line, the start and/or end points of the first scan line could be moved to create a second scan line. Decoding could then continue along the second scan line beginning at the invalid code word and moving in a forward direction.

By decoding in only one direction before moving the scan line, the complexity of the processing required to decode a partially damaged, distorted, or erased bar code would be reduced. The accuracy of the results obtained from the processing, however, might also be reduced.

The invention is limited only by the following claims.

What is claimed is:

1. A method for processing data representing a bar code comprising the steps of:

sampling and validating along a first scan line groups of elements comprising said bar code until one of said groups fails to validate; and beginning at a point associated with a last valid one of said groups, sampling and validating along a second scan line remaining ones of said groups of elements comprising said bar code without repeating sampling and validating of said groups of elements already determined to be valid.

2. A method for processing data representing a bar code comprising the steps of:

sampling and validating along a first scan line groups of elements comprising said bar code until one of said groups fails to validate; and beginning at a point associated with a last valid one of said groups, sampling and validating along a second scan line remaining ones of said groups of elements comprising said bar code, wherein said point associated with a last valid group is located along an outermost boundary of an element of said last valid group at least a predetermined distance from an intersection of said first scan line and said boundary.

3. The method of claim 1 further comprising the step of finding a start point and end point on said bar code, wherein said first scan line passes through said start point and said end point.

4. The method of claim 1 further comprising the step of finding a start point and a scan direction, wherein said first scan line passes through said start point in the direction of said scan direction.

5. The method of claim 1 further comprising the steps of:

storing validated data sampled along said first scan line;

discarding invalid data sampled along said first scan line; and storing validated data sampled along said second scan line.

6. A program storage media readable by a machine, embodying a program of instructions executable by the machine to perform method steps for processing data representing a bar code, said method steps comprising:

sampling and validating along a first scan line groups of elements comprising said bar code until one of said groups fails to validate; and beginning at a point associated with a last valid one of said groups, sampling and validating along a second scan line remaining ones of said groups of elements comprising said bar code without repeating sampling and validating of said croups of elements already determined to be valid.

7. A program storage media readable by a machine, embodying a program of instructions executable by the machine to perform method steps for processing data representing a bar code, said method steps comprising:

sampling and validating along a first scan line groups of elements comprising said bar code until one of said groups fails to validate; and beginning at a point associated with a last valid one of said groups, sampling and validating along a second scan line remaining ones of said groups of elements comprising said bar code, wherein said point associated with a last valid group is located along an outermost boundary of an element of said last valid group at least a predetermined distance from an intersection of said first scan line and said boundary.

8. The storage media of claim 6 wherein said method steps further comprise finding a start point and end point on said bar code, wherein said first scan line passes through said start point and said end point.

9. The storage media of claim 6 wherein said method steps further comprise finding a start point and a scan direction, wherein said first scan line passes through said start point in the direction of said scan direction.

10. The storage media of claim 6 wherein said method steps further comprise:

storing validated data sampled along said first scan line;

discarding invalid data sampled along said first scan line; and storing validated data sampled along said second scan line.

11. A device for processing data representing a bar code comprising:

means for sampling and validating along a first scan line groups of elements comprising said bar code until one of said groups fails to validate; and means for, beginning at a point associated with a valid last one of said groups, sampling and validating along a second scan line remaining ones of said groups of elements comprising said bar code without repeating sampling and validating of said groups of elements already determined to be valid.

12. A device for processing data representing a bar code comprising;

means for sampling and validating along a first scan line groups of elements comprising said bar code until one of said groups fails to validate: and means for, beginning at a point associated with a valid last one of said groups, sampling and validating along a second scan line remaining ones of said groups of elements comprising said bar code, wherein said point associated with a last valid group is located along an outermost boundary of an element of said last valid group at least a predetermined distance from an intersection of said first scan line and said boundary.

13. The device of claim 11 further comprising means for finding a start point and end point on said bar code, wherein said first scan line passes through said start point and said end point.

14. The device of claim 11 further comprising means for finding a start point and a scan direction, wherein said first scan line passes through said start point in the direction of said scan direction.

15. The device of claim 11 further comprising:

means for storing validated data sampled along said first scan line;

means for discarding invalid data sampled along said first scan line; and means for storing validated data sampled along said second scan line.

16. A method for processing data representing a bar code comprising the steps of:

finding a start point and end point on said bar code, said start point and end point defining a first scan line;

beginning at said start point, sampling and validating along said first scan line in a direction of said end point groups of elements comprising said bar code until one of said groups fails to validate;

beginning at said end point, sampling and validating along said first scan line in a direction of said start point said groups of elements comprising said bar code until another of said groups fails to validate; and sampling and validating alone a second scan line said ones of said groups of elements that failed to validate during said sampling and validating along said first scan line without repeating sampling and validating of said groups of elements already determined to be valid.

17. A method for processing data representing a bar code comprising the steps of:

finding a start point and end point on said bar code, said start point and end point defining a first scan line;

beginning at said start point, sampling and validating along said first scan line in a direction of said end point groups of elements comprising said bar code until one of said groups fails to validate;

beginning at said end point, sampling and validating along said first scan line in a direction of said start point said groups of elements comprising said bar code until another of said groups fails to validate;

finding a new start point, wherein said new start point is associated with a first valid group, said first valid group being a last valid group sampled along said first scan line in the direction of said end point;

finding a new end point, wherein said new end point is associated with a second valid group, said second valid group being a last, valid group sampled along said first scan line in the direction of said start point; and beginning at said new start point, sampling and validating along a second scan line in a direction of said new end point said groups of elements comprising said bar code, said second scan line being defined by said new start point and said new end point.

18. A method for processing data representing a bar code comprising the steps of:

finding a start point and end point on said bar code, said start point and end point defining a first scan line;

beginning at said start point, sampling and validating along said first scan line in a direction of said end point groups of elements comprising said bar code until one of said groups fails to validate;

beginning at said end point, sampling and validating along said first scan line in a direction of said start point said groups of elements comprising said bar code until another of said groups fails to validate;

finding a new start point, wherein said new start point is associated with a first valid group, said first valid group being a last valid group sampled along said first scan line in the direction of said end point;

finding a new end point, wherein said new end point is associated with a second valid group, said second valid group being a last, valid group sampled along said first scan line in the direction of said start point; and beginning at said new end point, sampling and validating along a second scan line in a direction of said new start point said groups of elements comprising said bar code, said second scan line being defined by said new start point and said new end point.

19. The method of claim 17, wherein said new start point is located along an outermost boundary of an element of said first valid group at least a first predetermined distance from an intersection of said first scan line and said boundary of said element of said first valid group.

20. The method of claim 19, wherein said new end point is located along an outermost boundary of an element of said second valid group at least a second predetermined distance from an intersection of said first scan line and said boundary of said element of said second valid group.

21. The method of claim 20, wherein said first predetermined distance is equal to said second predetermined distance.

22. The method of claim 20, wherein said first predetermined distance is less than said second predetermined distance.

23. The method of claim 1 further comprising the step of capturing a two-dimensional image of said bar code, and wherein said first scan line and said second scan line pass through at least aportion of said two-dimensional image.

24. The program storage media of claim 6, wherein said method steps further comprise the step of receiving a two-dimensional image of said bar code, and wherein said first scan line and said second scah line pass through at least a portion of said two-dimensional image.

25. The device of claim 11 further comprising means for capturing a two-dimensional image of said bar code, and wherein said first scan line and said second scan line pass through at least a portion of said two-dimensional image.

26. The method of claim 16 further comprising the step of capturing a two-dimensional image of said bar code, and wherein said first scan line and said second scan line pass through at least a portion of said two-dimensional image.

* * * * *